(12) United States Patent
Lampert et al.

(10) Patent No.: US 10,747,543 B2
(45) Date of Patent: Aug. 18, 2020

(54) MANAGING TRACE INFORMATION STORAGE USING PIPELINE INSTRUCTION INSERTION AND FILTERING

(71) Applicant: Marvell International Ltd., Hamilton (BM)

(72) Inventors: Gerald Lampert, Hopkinton, MA (US); Nitin Prakash, Stow, MA (US); Shubhendu Sekhar Mukherjee, Southborough, MA (US); David Albert Carlson, Haslet, TX (US)

(73) Assignee: Marvell Asia Pte, Ltd., Singapore (SG)

( * ) Notice: Subject to any disclaimer, the term of this patent is extended or adjusted under 35 U.S.C. 154(b) by 49 days.

(21) Appl. No.: 16/234,813

(22) Filed: Dec. 28, 2018

(65) Prior Publication Data

US 2020/0210195 A1 Jul. 2, 2020

(51) Int. Cl.
*G06F 9/30* (2018.01)
*G06F 9/38* (2018.01)

(52) U.S. Cl.
CPC ........ *G06F 9/3838* (2013.01); *G06F 9/30043* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 6,106,573 A * | 8/2000 | Mahalingaiah | G06F 11/3466 712/204 |
| 6,314,530 B1 * | 11/2001 | Mann | G06F 11/348 714/25 |
| 6,772,324 B2 | 8/2004 | Akkary et al. | |
| 7,080,289 B2 | 7/2006 | Swaine et al. | |
| 7,093,236 B2 | 8/2006 | Swaine et al. | |
| 7,159,101 B1 * | 1/2007 | Thekkath | G06F 9/3836 712/218 |
| 7,185,234 B1 * | 2/2007 | Thekkath | G06F 11/3636 714/35 |
| 7,454,666 B1 | 11/2008 | Jordan et al. | |

(Continued)

OTHER PUBLICATIONS

Uzelac, V. et al., "Hardware-Based Load Value Trace Filtering for On-the-Fly Debugging," ACM Trans. Embed. Comput. Syst., May 2013, 12, 2s, Article 97, 18 pages. DOI:http://dx.doi.org/10.1145/2465787.2465799.

*Primary Examiner* — Corey S Faherty
(74) *Attorney, Agent, or Firm* — Young Basile Hanlon & MacFarlane, P.C.

(57) ABSTRACT

At least some instructions executed in a pipeline are each associated with corresponding trace information that characterizes execution of that instruction in the pipeline. A predetermined type of store instructions flow through a subset of contiguous stages of the pipeline. A signal is received to store a portion of the trace information. A stage before the subset of contiguous stages is stalled. A store instruction of the predetermined type is inserted into a stage at the beginning of the subset of contiguous stages to enable the store instruction to reach the memory access stage at which an operand of the store instruction including the portion of the trace information is sent out of the pipeline. The store instruction is filtered from a stage of the subset of contiguous stages that occurs earlier in the pipeline than a stage in which trace information is generated.

22 Claims, 3 Drawing Sheets

(56) References Cited

U.S. PATENT DOCUMENTS

| | | |
|---|---|---|
| 9,703,669 B2 | 7/2017 | Lampert et al. |
| 2004/0024995 A1 | 2/2004 | Swaine |
| 2005/0120337 A1 | 6/2005 | Serrano et al. |
| 2015/0269054 A1 | 9/2015 | Kothamasu et al. |
| 2016/0378636 A1* | 12/2016 | Strong ................ G06F 11/3466 714/45 |

* cited by examiner

MANAGING TRACE INFORMATION STORAGE USING PIPELINE INSTRUCTION INSERTION AND FILTERING

BACKGROUND

The invention relates to managing trace information storage using pipeline instruction insertion and filtering.

Processors can be configured to capture trace information, which can be used for testing and debugging of programs. For example, trace information can include a history of particular instructions that were executed in the pipeline of a processor for any number of processes or threads executing on that processor. The capture of trace information can generally be enabled or disabled. For a given thread, the trace information may include an entire instruction stream that includes every instruction that was executed in the lifetime of the thread and corresponding results, if any, for each instruction. Or, the trace information may include only selected instructions, from which other instructions that executed could be reconstructed if necessary. For example, to reduce the amount of information that needs to be stored to capture the trace information, the instruction stream can be filtered such that only instructions affecting control flow (e.g., branch instructions) and their resulting control flow changes (e.g., branch "taken," or "not taken"), and certain other instructions that have dynamically determined results (e.g., load instructions and store instructions) are included. Whereas, instructions that do not affect control flow and whose results can be easily reconstructed from static analysis of the binary code for the original program (e.g., arithmetic operation instructions, such as add or subtract) are filtered out of the trace information. Other optimizations are also possible. For some processors, dedicated trace circuitry can be used to capture and store trace information during operation of a processor's pipeline.

SUMMARY

In one aspect, in general, an integrated circuit includes: at least a first processor core executing instructions in a pipeline, wherein at least some of the instructions are each associated with corresponding trace information that characterizes execution of that instruction in the pipeline; and control circuitry configured to manage a flow of a predetermined type of store instructions through a subset of contiguous stages of the pipeline that includes at least one memory access stage. The managing includes: receiving a signal to store a portion of the trace information, stalling a stage before the subset of contiguous stages of the pipeline, inserting a store instruction of the predetermined type into a stage at the beginning of the subset of contiguous stages of the pipeline to enable the store instruction of the predetermined type to reach the memory access stage at which an operand of the store instruction of the predetermined type including the portion of the trace information is sent out of the pipeline, and filtering the store instruction of the predetermined type from a stage of the subset of contiguous stages of the pipeline that occurs earlier in the pipeline than a stage in which trace information is generated.

In another aspect, in general, a method includes: executing instructions in a pipeline of a first processor core, wherein at least some of the instructions are each associated with corresponding trace information that characterizes execution of that instruction in the pipeline; and managing a flow of a predetermined type of store instructions through a subset of contiguous stages of the pipeline that includes at least one memory access stage. The managing includes: receiving a signal to store a portion of the trace information, stalling a stage before the subset of contiguous stages of the pipeline, inserting a store instruction of the predetermined type into a stage at the beginning of the subset of contiguous stages of the pipeline to enable the store instruction of the predetermined type to reach the memory access stage at which an operand of the store instruction of the predetermined type including the portion of the trace information is sent out of the pipeline, and filtering the store instruction of the predetermined type from a stage of the subset of contiguous stages of the pipeline that occurs earlier in the pipeline than a stage in which trace information is generated.

Aspects can include one or more of the following features.

The stage before the subset of contiguous stages of the pipeline comprises an instruction fetch stage.

The stage at the beginning of the subset of contiguous stages of the pipeline comprises an issue stage.

The stage in which trace information is generated comprises a commit stage.

The trace information is accumulated in a trace information buffer that has a size that corresponds to a size of the operand of the store instruction of the predetermined type.

The signal to store the portion of the trace information occurs in response to the trace information buffer being full.

The signal to store the portion of the trace information occurs in response to a predetermined instruction being executed in the pipeline.

The operand of the store instruction of the predetermined type includes information indicating an end of the portion of the trace information if the trace information buffer is not full when the predetermined instruction is executed.

The portion of the trace information is sent out of the pipeline to a write buffer that stores operands from multiple types of store instructions including the predetermined type of store instructions.

The write buffer is flushed of at least the operands from the instructions of the predetermined type in response to a request for trace information.

The request for trace information is received from a second processor core in the integrated circuit.

Aspects can have one or more of the following advantages.

When operating trace circuitry, it is useful to ensure that the storage of the trace information using that trace circuitry is performed at a speed that is compatible with the execution rate of the pipeline. For example, some dedicated trace circuitry may write the trace information into a dedicated trace buffer. To ensure compatibility, an internal trace buffer may need to be included within the processor, or the bandwidth of a path to an external trace buffer may need to be sufficiently large. Potential challenges with such approaches include avoiding frequent overflow of such internal or external trace buffers, which could force an interrupt to the pipeline. Frequent interrupts to the pipeline, to allow time for software to drain such trace buffers, could cause significant performance loss. The techniques described herein enable trace circuitry to use the pipeline to buffer trace information in a portion of memory instead of in an internal or external trace buffer, ensuring compatibility with the execution rate of the pipeline, and avoiding such frequent interrupts. While the circuitry may accumulate a relatively small amount of trace data within the processor, that data is sent to memory using a storage instruction that can be executed by the pipeline itself, as described in more detail below.

Other features and advantages of the invention will become apparent from the following description, and from the claims.

DESCRIPTION

Figure 1:
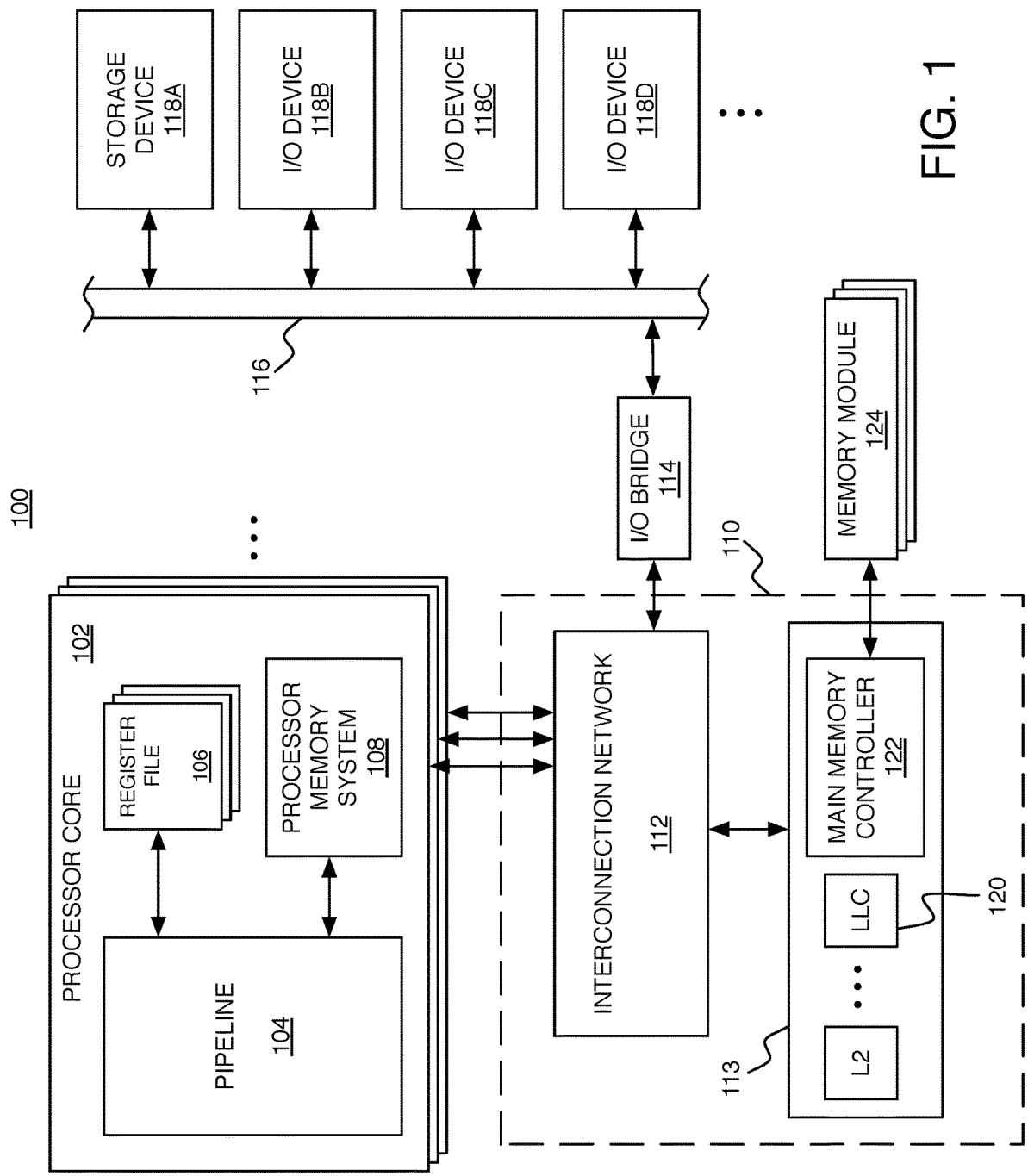
FIG. 1 is a schematic diagram of a computing system.

FIG. 1 shows an example of a computing system 100 in which the techniques described herein can be used. The system 100 includes at least one processor core 102, which could be a single central processing unit (CPU), or one of multiple processor cores in a multi-core architecture, where each processor core (or each "core") comprises an individual CPU with associated circuitry. In this example of a multi-core architecture, each processor core 102 includes a pipeline 104, one or more register files 106, and a processor memory system 108. Each processor core 102 is connected to an uncore 110, which includes an interconnection network 112 (e.g., bus, cross-bar switch, mesh network, etc.) and an external memory system 113. The interconnection network 112 enables communication with the external memory system 113 and an input/output (I/O) bridge 114. The I/O bridge 114 enables communication over an I/O bus 116, with various different I/O devices including a storage device 118A and other I/O devices 118B-118D (e.g., network interface, display adapter, and/or user input devices such as a keyboard or mouse). The storage device 118A such as a disk drive or other large capacity (typically non-volatile) storage device can spare some space to serve as secondary storage (or a 'backing store') in a virtual memory scheme for the (typically volatile) main memory.

The processor memory system 108 and external memory system 113 together form a hierarchical memory system including at least a first level (L1) cache within the processor memory system 108, and any number of higher level (L2, L3, . . . ) caches within the external memory system 113. At each level, the cache can include a module that provides an instruction cache for caching instructions, and separate module that provides a data cache for caching data. In addition to an L1 instruction cache and data cache, the processor memory system 108 includes a TLB, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104.

The highest level cache within the external memory system 113 (which may be the L2 cache if there are only two levels in the hierarchy) is the LLC 120, which is accessed just before main memory. Of course, this is only an example. The exact division between which level caches are within the processor memory system 108 and which are in the external memory system 113 can be different in other examples. For example, the L1 cache and the L2 cache could both be internal to the processor core 102, and the L3 (and higher) caches could be external to the processor core 102. Each processor core 102 could have its own internal L1 cache, and the processor cores could share an L2 cache. The external memory system 113 also includes a main memory controller 122, which is connected to any number of memory modules 124 serving as main memory (e.g., Dynamic Random Access Memory modules). In a particular cache level of the hierarchy, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (read or write) the memory block from a higher level cache, or from the main memory (in the case of a miss in the LLC).

The pipeline 104 includes multiple stages through which instructions advance, a cycle at a time. An instruction is fetched (e.g., in an instruction fetch (IF) stage or stages). An instruction is decoded (e.g., in an instruction decode (ID) stage or stages) to determine an operation and one or more operands. Alternatively, in some pipelines, the instruction fetch and instruction decode stages could overlap. An instruction has its operands fetched (e.g., in an operand fetch (OF) stage or stages). An instruction issues, which typically starts progression of the instruction through one or more stages of execution. Execution may involve applying the instruction's operation to its operand(s) for an arithmetic logic unit (ALU) instruction, storing or loading to or from a memory address for a memory instruction, or may involve evaluating a condition of a conditional branch instruction to determine whether or not the branch will be taken. Finally, an instruction is committed, which may involve storing a result (e.g., in a write back (WB) stage or stages). Instructions are fetched based on a program counter (PC), which is a pointer that is used to identify instructions within memory (e.g., within a portion of main memory, or within an instruction cache of the processor). The PC may advance through addresses of a block of compiled instructions (called a "basic block"), incrementing by a particular number of bytes (depending on how long each instruction is and on how many instructions are fetched at a time).

Figure 2:
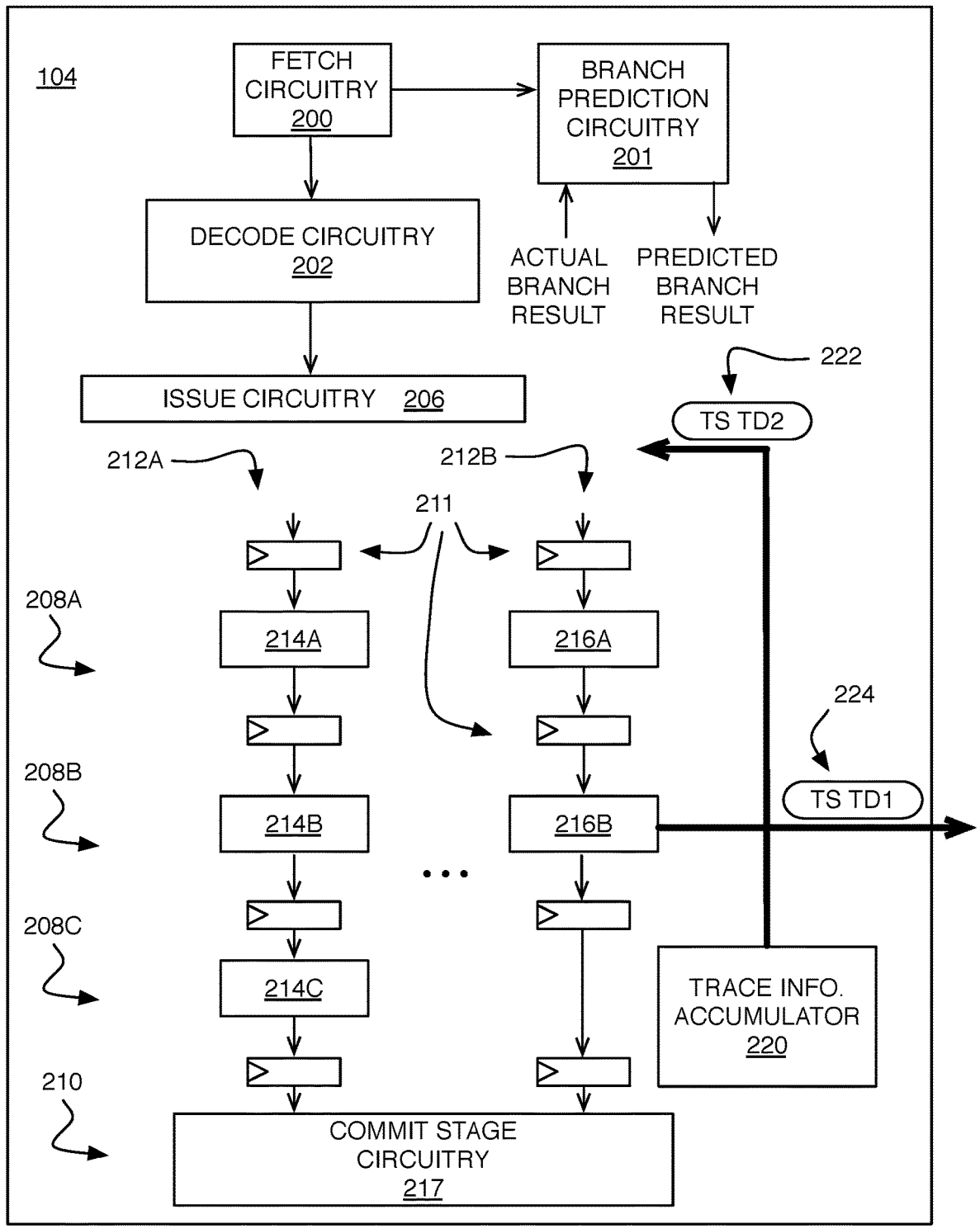
FIG. 2 is a schematic diagram of a processor core pipeline.

FIG. 2 shows an example in which the pipeline 104 is configured to accumulate and store trace information in an efficient manner using the existing memory access circuitry within the pipeline 104, as will be described in more detail below. The pipeline 104 includes circuitry for the various stages. For one or more instruction fetch stages, instruction fetch circuitry 200 provides a PC to an instruction cache in the processor memory system 108 to fetch instructions to be fed into the pipeline 104. For example, the PC can be a virtual address of the next instruction, in which case the PC can be incremented by the length of a virtual address in the case of sequential execution (i.e., without taking any branches). The fetch circuitry 200 also provides the program counter to branch prediction circuitry 201, which is used to provide a predicted branch result for branch instructions. The branch prediction circuitry 201 also stores branch history information that is updated based on a received actual branch result. In some implementations, some or all of the branch prediction circuitry 201 is considered part of the fetch circuitry 200. For one or more instruction decode stages, instruction decode circuitry 202 stores information in an instruction buffer for instructions in the instruction window waiting to be issued.

Issue circuitry 206 determines in which cycle each of the instructions in the instruction buffer are to be issued, which makes them available to progress through circuitry of the execution stages 208A, 208B, and 208C of the pipeline 104. (For simplicity, this example has three execution stages, but other examples may have more or fewer execution stages.) There is also at least one commit stage 210 that commits results of instructions that have made their way through the execution stages 208A, 208B, and 208C. For example, commit stage circuitry 217 may write back a result into a register file 106 (FIG. 1).

Between adjacent stages of the pipeline 104, the various paths through the pipeline circuitry include pipeline registers 211 (shown in FIG. 2 for the execution stages), which store results of an upstream stage waiting to be passed downstream to the next stage. The pipeline registers 211 may be clocked by (i.e., receive a clock signal derived from) a common clock (not shown). Thus, each clock cycle, each pipeline register 211 (also called a latch, or a set of flip-flops) passes a result from its input to its output and becomes ready to receive a new result in its input after that result has been produced by the circuitry of that stage.

There may be multiple separate paths through the execution stages that include various circuitry for executing different types of instructions. In FIG. 2, two paths 208A and 208B are shown, but the execution stages may include any number of paths with corresponding circuitry separated by pipeline registers 211. The number of paths through the execution stages is generally dependent on the specific architecture but may include enough paths such that a number of instructions up to the issue width can progress through the same execution stages in the same cycles. The number of stages that include functional circuitry for a given path may also differ. In this example, the first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A, the second execution stage 208B, respectively, with the third execution stage 208C being simply a "silo stage" that passes a result along without performing further computation, ensuring that each path passes through the same number of stages through the pipeline. One path may include circuitry for executing memory instructions, another path may include units for various operations (e.g., ALU, multiplier, floating point unit), and another path may include circuitry for performing memory access instructions, including load instructions that read data values from the memory system, and store instructions to write data values to the memory system.

One of the types of data that can be stored using the store instructions is trace information that represents a history of some or all of the instructions that were executed in the pipeline for any number of processes or threads. As described above, instead of accumulating large amounts of trace information in an internal buffer, a trace information accumulator 220 accumulates just enough trace information to fit within an operand of a store instruction, using the pipeline itself as a pathway to buffer trace information in a portion of the main memory of the computing system 100. For example, trace information can be written to a virtual address space that is mapped to a portion of physical address space, or can be written directly to a portion of physical address space. Since main memory is serving as the trace buffer, there is less need to interrupt the pipeline to manage trace information (e.g., not until spilling memory to disk), so the slowdown due to frequent interrupts may be alleviated.

The trace information accumulator 220 is able to accumulate a portion of trace information that has a particular size, called "trace data," and this trace data can then be stored using a special type of store instruction called a Trace Store (TS) instruction. The trace information accumulator 220 receives information at the commit stage about instructions that have finished executing (i.e., that have been "committed" or "retired"), and information about any operands of those instructions and any associated results of those instructions. This information is accumulated as "trace packets" of variable size associated with different instructions in the instruction stream, but can be broken up into fixed-size portions of trace data, as described in more detail below. After one portion of trace data is output from the accumulator 220 for storage using a TS instruction, another portion of trace data can be accumulated. This TS instruction may be, for example, a version of a standard store instruction that stores a data of a particular size at a series of addresses within an address space.

These TS instructions can then be inserted into the pipeline at the same stage that the issue circuitry 206 inserts decoded store instructions. For example, the TS instruction 222 shown in FIG. 2 may be inserted into an instruction stream in the path 212B at the issue stage of the pipeline. Successive TS instructions for storing trace data accumulated by the trace information accumulator 220 may be inserted consecutively within the instruction stream, or may be inserted non-consecutively with other issued instructions falling between them in the instruction stream. For example, the TS instruction 222 for storing trace data TD2 may have been preceded by the TS instruction 224 for storing trace data TD1. So, in this example, TS instruction 224 is further along in the pipeline, and is already being sent by circuitry 216B into the memory system at the cycle in which the TS instruction 222 is being inserted into the pipeline.

The issue circuitry 206 can also be configured to cooperatively insert TS instructions, by communicating with the trace information accumulator 220 to make room for inserting the TS instructions. For example, one or more issue slots can be made available by scheduling a "bubble" within the instruction stream. The TS instructions and non-TS instructions can be independently scheduled. In particular, the issue circuitry 206 does not need to analyze dependencies between these special TS instructions and non-TS instructions. In alternative implementations, the TS instructions may be inserted at different pipeline stages (e.g., later than the usual issue slots), but at an appropriate stage for executing a store instruction.

The pipeline 104 is able to distinguish between non-TS instructions, whose execution is being traced, and TS instructions that are executed along with non-TS instructions but are not themselves being traced. For example, there may be circuitry to filter out TS instructions before they reach the commit stage (e.g., based on an identifiable flag), or the trace information accumulator 220 may itself act as a filter to distinguish TS and non-TS instructions and prevent any results associated with TS instructions from being committed.

Figure 3:
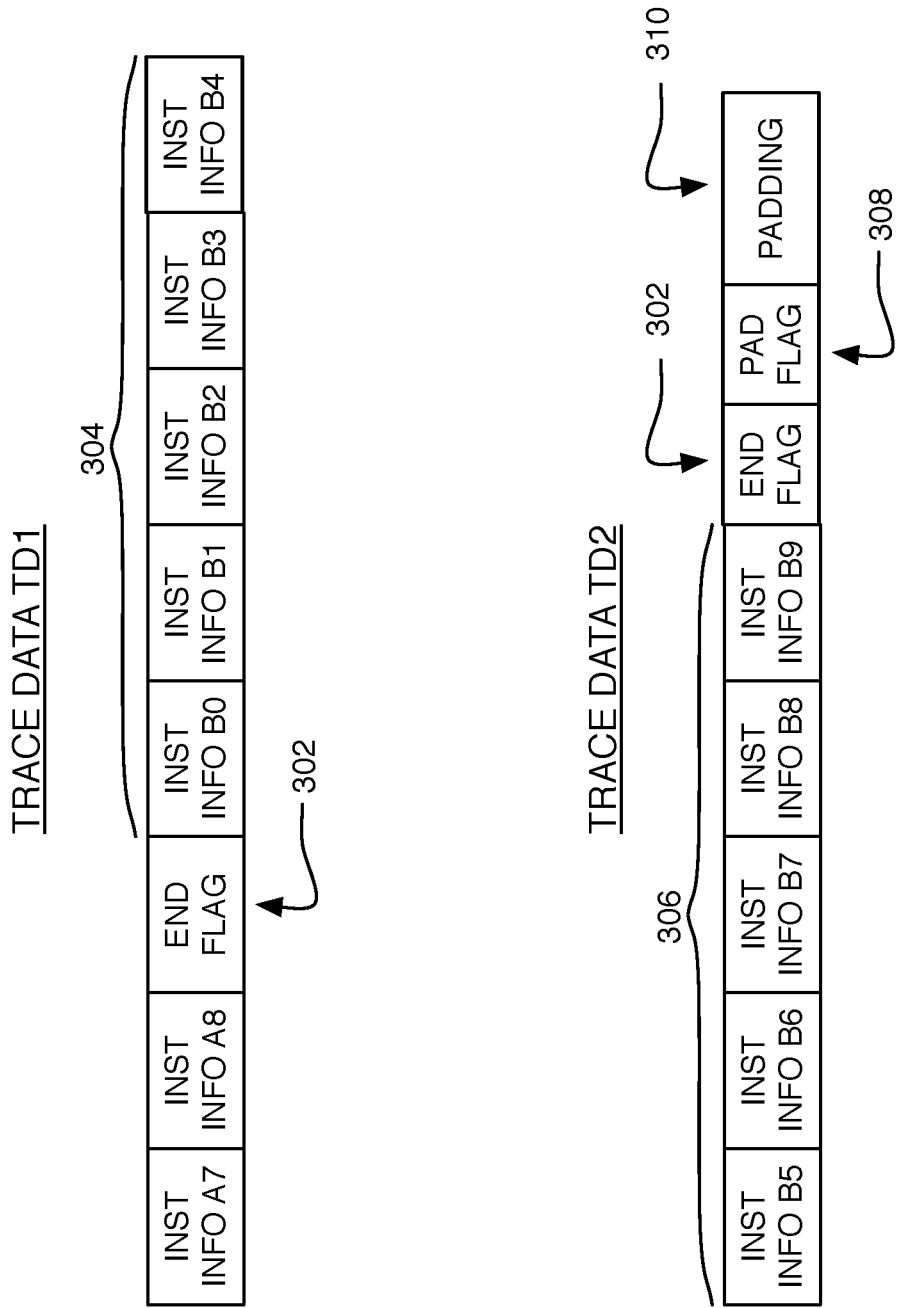
FIG. 3 is a schematic diagram of accumulated trace data.

FIG. 3 shows an example of a technique for forming fixed-size portions of trace data from variable length trace packets. The trace information accumulated by the trace information accumulator 220 includes a sequence of segments (e.g., 1-byte segments) of instruction information pertaining to a given instruction that is being committed. For example, each segment may include the opcode, the operands, the result, and any other relevant information associated with the given instruction. For example, context information, or other information that was relevant for the execution of the given instruction may be included. A full group of segments for a given instruction is called a trace packet. Since a trace packet may contain a variable number of segments, in some implementations, a trace packet ends with a segment representing an "end flag" that indicates that there are no additional segments in the trace packet.

The sequence of instruction information segments are accumulated by the trace information accumulator 220 until a full set of trace data has been formed. A full set may correspond to the number of bytes that are stored by a TS instruction (e.g., 8 bytes). A given set of trace data may include segments from different trace packets. In the example of FIG. 3, a set of trace data TD1 includes segments of instruction information A7 and A8 in a trace packet associated with an instruction A, and an end flag 302. The trace data TD1 also includes an initial group 304 of segments of instruction information B1-B4 in a trace packet associated with an instruction B. However, the remaining group 306 of segments of instruction information B5-B9 in the same trace packet are included in a different set of trace data TD2. There is then another end flag 302 indicating the end of the trace packet.

At an appropriate time, the accumulated instruction information segments are output from the trace information accumulator 220 for insertion into the pipeline as an argument of a TS instruction. In some cases, that output time may be when the trace data is full, as for trace data TD1. In other cases, the output of accumulated instruction information segments is triggered (e.g., in response to a software event) at a time when the trace data is not full, as for trace data TD2. In this example, trace data TD2 includes the group 306 of five instruction information segments, an end flag 302, and a pad flag 308, which indicates that the remaining portion of the fixed-size trace data contains no information (e.g., zero padding). Alternatively, in some implementations, no pad flag is needed, since the bit sequence that forms the padding may be automatically detected. Alternatively, in some implementations, the TS instruction may have a variable size, in which case, individual trace packets can be accumulated and output as an argument of the TS instruction, with no need for an end flag or a pad flag. But, a fixed-size TS instruction may be configured to match a particular length for a standard store instruction, and thus may be configured to be implemented using a standard store instruction of an instruction set architecture. A single format (e.g., a single storage size) for a TS instruction may also be simpler to implement than multiple formats.

There may also be interactions between multiple processor cores in a multi-core processor architecture when storing trace information using the techniques described herein. Referring again to FIG. 2, when a TS instruction 224 is executed, sending trace data TD1 to the memory system, that trace data TD1 may be temporarily stored in a write buffer within the processor memory system 108. The write buffer accumulates some amount of data for storage, and is then flushed to send that data to the external memory system 113 and/or to main memory. If one processor core "core 0" has a TS instruction in its write buffer, and another processor core "core 1" is executing instructions that read trace information, core 1 may not be able to read the most recent trace information until the write buffer of core 0 is flushed to a point of observation (e.g., the LLC 120). There may also be other times when the processor core 102 ensures that its write buffer is flushed of TS instructions. In such situations, the entire write buffer can be flushed, or there can be a selective flushing where only the TS instructions are flushed, which may be quicker than a full flush. Also, it may not be efficient to flush the entire write buffer before it would normally be flushed under normal operation, just to make trace information visible. The write buffer may also be configured to treat TS instructions differently from other store instructions, and evict trace data from the write buffer immediately, or after a short delay, for example. The circuitry for handling trace information may also be configured to acknowledge the completion of the storage of trace information to a globally visible observation point in response to an explicit request to flush trace information.

Other embodiments are within the scope of the following claims.

What is claimed is:

1. An integrated circuit comprising:
at least a first processor core executing instructions in a pipeline, wherein at least some of the instructions are each associated with corresponding trace information that characterizes execution of that instruction in the pipeline; and
control circuitry configured to manage a flow of a predetermined type of store instructions through a subset of contiguous stages of the pipeline that includes at least one memory access stage, wherein the managing includes:
receiving a signal to store a portion of the trace information,
stalling a stage before the subset of contiguous stages of the pipeline,
inserting a store instruction of the predetermined type into a stage at the beginning of the subset of contiguous stages of the pipeline to enable the store instruction of the predetermined type to reach the memory access stage at which an operand of the store instruction of the predetermined type including the portion of the trace information is sent out of the pipeline, and
filtering the store instruction of the predetermined type from a stage of the subset of contiguous stages of the pipeline that occurs earlier in the pipeline than a stage in which trace information is generated.

2. The integrated circuit of claim 1, wherein the stage before the subset of contiguous stages of the pipeline comprises an instruction fetch stage.

3. The integrated circuit of claim 2, wherein the stage at the beginning of the subset of contiguous stages of the pipeline comprises an issue stage.

4. The integrated circuit of claim 3, wherein the stage in which trace information is generated comprises a commit stage.

5. The integrated circuit of claim 1, wherein the trace information is accumulated in a trace information buffer that has a size that corresponds to a size of the operand of the store instruction of the predetermined type.

6. The integrated circuit of claim 5, wherein the signal to store the portion of the trace information occurs in response to the trace information buffer being full.

7. The integrated circuit of claim 5, wherein the signal to store the portion of the trace information occurs in response to a predetermined instruction being executed in the pipeline.

8. The integrated circuit of claim 7, wherein the operand of the store instruction of the predetermined type includes information indicating an end of the portion of the trace information if the trace information buffer is not full when the predetermined instruction is executed.

9. The integrated circuit of claim 1, wherein the portion of the trace information is sent out of the pipeline to a write buffer that stores operands from multiple types of store instructions including the predetermined type of store instructions.

10. The integrated circuit of claim 9, wherein the write buffer is flushed of at least the operands from the instructions of the predetermined type in response to a request for trace information.

11. The integrated circuit of claim 10, wherein the request for trace information is received from a second processor core in the integrated circuit.

12. A method comprising:
executing instructions in a pipeline of a first processor core, wherein at least some of the instructions are each associated with corresponding trace information that characterizes execution of that instruction in the pipeline; and
managing a flow of a predetermined type of store instructions through a subset of contiguous stages of the pipeline that includes at least one memory access stage, wherein the managing includes:
receiving a signal to store a portion of the trace information,
stalling a stage before the subset of contiguous stages of the pipeline,
inserting a store instruction of the predetermined type into a stage at the beginning of the subset of contiguous stages of the pipeline to enable the store instruction of the predetermined type to reach the memory access stage at which an operand of the store instruction of the predetermined type including the portion of the trace information is sent out of the pipeline, and
filtering the store instruction of the predetermined type from a stage of the subset of contiguous stages of the pipeline that occurs earlier in the pipeline than a stage in which trace information is generated.

13. The method of claim 12, wherein the stage before the subset of contiguous stages of the pipeline comprises an instruction fetch stage.

14. The method of claim 13, wherein the stage at the beginning of the subset of contiguous stages of the pipeline comprises an issue stage.

15. The method of claim 14, wherein the stage in which trace information is generated comprises a commit stage.

16. The method of claim 12, wherein the trace information is accumulated in a trace information buffer that has a size that corresponds to a size of the operand of the store instruction of the predetermined type.

17. The method of claim 16, wherein the signal to store the portion of the trace information occurs in response to the trace information buffer being full.

18. The method of claim 16, wherein the signal to store the portion of the trace information occurs in response to a predetermined instruction being executed in the pipeline.

19. The method of claim 18, wherein the operand of the store instruction of the predetermined type includes information indicating an end of the portion of the trace information if the trace information buffer is not full when the predetermined instruction is executed.

20. The method of claim 12, wherein the portion of the trace information is sent out of the pipeline to a write buffer that stores operands from multiple types of store instructions including the predetermined type of store instructions.

21. The method of claim 20, wherein the write buffer is flushed of at least the operands from the instructions of the predetermined type in response to a request for trace information.

22. The method of claim 21, wherein the request for trace information is received from a second processor core in communication with the first processor core.

* * * * *